United States Patent
Fissler

(10) Patent No.: US 9,177,460 B2
(45) Date of Patent: Nov. 3, 2015

(54) PRESSURE DETECTION SYSTEM FOR A PRESSURE COOKER INDICATING USE-RELATED WEAR

(75) Inventor: Folkhart Fissler, Idar-Oberstein (DE)

(73) Assignee: FISSLER GMBH (DE)

( * ) Notice: Subject to any disclaimer, the term of this patent is extended or adjusted under 35 U.S.C. 154(b) by 121 days.

(21) Appl. No.: 13/883,219

(22) PCT Filed: Nov. 4, 2011

(86) PCT No.: PCT/EP2011/069415
§ 371 (c)(1),
(2), (4) Date: Jun. 6, 2013

(87) PCT Pub. No.: WO2012/062657
PCT Pub. Date: May 18, 2012

(65) Prior Publication Data
US 2013/0249698 A1    Sep. 26, 2013

(30) Foreign Application Priority Data

Nov. 11, 2010  (DE) .......................... 10 2010 051 060
Feb. 26, 2011  (DE) ..................... 20 2011 003 293 U

(51) Int. Cl.
| | |
|---|---|
| G08B 21/00 | (2006.01) |
| G08B 21/18 | (2006.01) |
| A47J 27/08 | (2006.01) |
| A47J 27/09 | (2006.01) |
| A47J 27/62 | (2006.01) |
| G01L 19/08 | (2006.01) |

(52) U.S. Cl.
CPC ........... *G08B 21/182* (2013.01); *A47J 27/0802* (2013.01); *A47J 27/09* (2013.01); *A47J 27/62* (2013.01); *G01L 19/083* (2013.01)

(58) Field of Classification Search
CPC ..................................................... G08B 21/182
USPC ........ 340/626; 219/496; 220/203.1, 316, 912; 99/341, 403
See application file for complete search history.

(56) References Cited

U.S. PATENT DOCUMENTS

2008/0290090 A1*  11/2008  Kindler et al. ........... 220/203.05

FOREIGN PATENT DOCUMENTS

| | | |
|---|---|---|
| DE | 9206061 U1 | 9/1992 |
| DE | 4404152 A1 | 8/1995 |
| EP | 0587532 A1 | 3/1994 |
| EP | 1884179 A2 | 2/2008 |
| EP | 2002765 A1 | 12/2008 |
| WO | 2010105208 A1 | 9/2010 |

OTHER PUBLICATIONS

International Search Report for corresponding application PCT/EP2011/069415 filed on Nov. 4, 2011; Mail date Mar. 2, 2012.

* cited by examiner

*Primary Examiner* — Jeffery Hofsass
(74) *Attorney, Agent, or Firm* — Cantor Colburn LLP

(57) ABSTRACT

The invention describes a pressure detection system for a pressure cooker, having a sensor (17) for detecting a pressure prevailing inside the pressure cooker by means of measured values, a computer unit (16) connected to the sensor (17), and a display (3, 4), wherein the computer unit (16) is designed to evaluate the measured values supplied by the sensor (17) and to establish whether at least one first threshold value (S1) has been reached. In order to indicate use-related wear, the computer unit (16) is further designed to continue a counter when the measured value reaches the first threshold value (S1) and to output a notification on the display (3, 4) when a predefined value of the counter is reached.

15 Claims, 3 Drawing Sheets

PRESSURE DETECTION SYSTEM FOR A PRESSURE COOKER INDICATING USE-RELATED WEAR

TECHNICAL FIELD

The invention relates to a pressure detection system for a pressure cooker, comprising a sensor for detecting a pressure prevailing inside the pressure cooker by means of measured values, a computer unit connected to the sensor, and a display, the computer unit being designed to evaluate the measured values supplied by the sensor and to establish whether at least one first threshold value has been reached, for example whether said at least one first threshold value has been overshot or undershot. Here, in accordance with the invention, the pressure does not have to be detected in conventional pressure measurement units. In the present application, the detection of a pressure prevailing inside the pressure cooker means that sensor measured values are detected in any units that depend in a defined manner on the pressure inside the pressure cooker and are therefore a measure for the pressure prevailing in the pressure cooker without having to specify the pressure exactly.

BRIEF DESCRIPTION OF RELATED ART

In the case of pressure cookers, also referred to in the technical field as steam pressure cookers, the content to be cooked is enclosed in a steam-tight manner in the pressure cooker together with a liquid, and the pressure cooker is heated on a hob. During the heating process, liquid, generally water, located in the pressure cooker evaporates. This results in a rise in pressure in the pressure cooker. The cooking time in the pressure cooker is determined substantially by the time in which the steam pressure in the cooking pot lies within a specific working range, that is to say above a threshold value "onset of the cooking period" and below a threshold value "excessive pressure".

In this regard, pressure detection systems of the type mentioned in the introduction are already known, which detect the internal pressure in a pressure cooker and, when the threshold value "onset of the cooking period" is reached, switch on a clock or a timer.

For example DE 92 06 061 U1 thus discloses a steam pressure cooker with a lid provided with a pressure display, wherein a timer is fitted on the lid in a region of the pressure display and is provided with a device for establishing a cooking time, a device responsive to the position of the pressure display for delaying the progression of the set cooking time, and a signal transmitter responsive during progression of the set cooking time. To this end, the pressure display comprises a permanent magnet so that the position of the pressure display can be established by a device electromagnetically interrogating the magnetic field. The timer is started once reaching 15 or exceeding the predefined pressure stage (corresponding to a position of the pressure display), wherein the further progression of the set cooking time can be interrupted if the predefined pressure is undershot in the meantime.

A similar measurement principal is described in EP 0 587 532 B1 with a safety valve for a steam pressure cooker comprising a pressure pin mounted axially displaceably in a valve housing and subject to the action of a valve spring. A bar magnet is attached to the pressure pin and is displaced with the pressure pin in accordance with the pressure prevailing in the pressure cooker. The displacement of the bar magnet is detected by a Hall sensor, which measures the magnetic field of the bar magnet. Since the voltage that can be tapped at the Hall sensor in a used measurement range is largely proportional to the pressure prevailing in the steam pressure cooker, substantially any pressure between zero and an upper limit pressure can be measured by the safety valve. The signal of this position sensor can be used for example as a control signal for controlling control variables of any type.

A problem of pressure cookers of this type lies in the fact that they contain five safety-relevant closure parts. Closure parts with safety-relevant functions have to be replaced at regular intervals so that the pressure cooker remains functionally safe. In particular, these safety-relevant closure parts include the ring seals arranged in the lids, said seals allowing a steam-tight seal between the pressure cooker and the lid. The ring seals are normally produced from silicone or nitrile butadiene rubber (MBR). Both materials have the disadvantage that the properties thereof change as a result of use and/or age. For example, this may result in the fact that, when the ring seal is worn as a result of frequent use or excessive age, safety devices are no longer responsive at a high pressure level or are only responsive at a high pressure level. They may then no longer reliably perform the pressure relief function in some circumstances when an excessive pressure is produced in the pressure cooker. In the worst-case scenario, this may cause the lid to be lifted off at high pressure and could be life-threatening.

It has been found that the wearing parts of pressure cookers are used too long and are replaced too late in practice. This is also down to the fact that the consumer generally loses track of when he purchased a pressure cooker and for example of when the ring seal was last replaced.

BRIEF SUMMARY

The disclosure proposes a servicing function that notifies the user of a necessary replacement of wearing parts in accordance with a period of use and/or frequency of use of the pressure cooker.

Herein, a pressure detection system is provided having a computer unit designed in particular to continue, for example to increment or decrement, a counter when the measurement value of the sensor reaches, that is to say exceeds or falls below, a first threshold value, and to output a notification (in the form of a symbol, a flashing light, an acoustic warning sound and/or the like) on the display when a predefined value of the counter is reached. To this end, the first threshold value can be selected in particular in such a way that it is then only reached when, due to a rise in pressure in the pressure cooker, it can be concluded that the pressure cooker is being heated on a stove. Since this typically occurs during a cooking process, the number of cooking processes of the pressure cooker can be detected by the counter, and therefore a notification on a display can be predefined by a predefined counter value as a limit value, which can also be parameterized where necessary, when a replacement of the wearing parts is necessary.

In order to avoid miscounts as a result of external influences of the measured value of the sensor, for example when cleaning the pressure cooker, the computer unit can be designed in accordance with a preferred development of the invention to check whether the measured value has reached the first threshold value in an uninterrupted manner for a specific (first) period of time, and to continue the counter only once the first threshold value has been reached without interruption for the first period of time. This period of time can be a few seconds or minutes for example; the period of time is preferably between 10 seconds and 1 minute, for example 15 or 25 seconds. The reliability of the wear display integrated into the pressure detection system is thus increased significantly.

Since ring seals made of silicone or nitrile butadiene rubber also become worn as a result of age, irrespectively of a use of the pressure cooker, and may no longer fulfill their safety function, the computer unit may also designed in an extension of the inventive concept to then also output the notification on the display indicating a necessary replacement of the wearing parts when another (second) period of time has elapsed after initialization of the pressure detection system. The system can be initialized for example as a result of first-time switch-on, first-time use of a battery and/or the execution of an initialization function, for example by actuation of a button or combination of buttons of an operating interface by the user. The second period of time is typically much longer than the first period of time and is expediently in the range between 1 and 3 years. In accordance with invention, a period of time of approximately 2 years can be selected.

So that this information is not lost, for example in the event of a necessary battery change, the current counter value and the current progression of the second period of time can be permanently stored (either by storing the time already elapsed or by storing the remaining time of the second period still remaining) in a non-volatile memory, in particular a flash memory, irrespectively of an energy supply of the pressure detection system. The reset is implemented by the separate initialization function already mentioned.

So that the pressure detection system not only signals when a threshold value has been reached, but also indicates whether such a threshold value is maintained in an ongoing manner, the computer unit can be designed in accordance with the invention to generate a threshold value status signal when a threshold value, that is to say the aforementioned first threshold value or a further threshold value, is reached and to only cancel this threshold value status signal when the threshold value less a hysteresis value is no longer reached. This hysteresis value may preferably be parameterisable. The objective of the hysteresis value is to avoid unnecessary fluctuations in the threshold value status and signal.

The function of this hysteresis value will be explained briefly hereinafter on the basis of an example. It is assumed that the pressure detection system is designed in such a way that the threshold value status signal is then triggered with rising pressure when the measured value of the sensor exceeds a specific threshold value. This achieved threshold value status signal is then only cancelled again when the pressure assumes a value that is reduced by the amount of the hysteresis value. A constant switching on and off of the threshold value status signal as a result of measurement inaccuracies is thus prevented. Of course, hysteresis values of this type can also be implemented with an accordingly reversed sign for an initially falling pressure.

In accordance with a preferred development of the present invention, a timer, which is started when a threshold value is reached, for example the first threshold value, but in particular a second threshold value, may also be provided in the pressure detection system, said timer outputting a time lapse signal once a period of time preset in the timer has elapsed. The time preset in the timer can be predefined in accordance with the invention by means of user input via a user interface. The timer may simply be implemented in the computer unit as an application.

In accordance with the invention, the computer unit may also be designed to output a signal, in particular an optical and/or acoustic signal, when a threshold value is reached and/or during a generated threshold value status signal. For example, an acoustic signal may be a sound or a corresponding sequence of sounds generated by a piezo element, the piezo element being activated in simple manner by the computer unit.

In conjunction with a pressure cooker, it is particularly advantageous in accordance with the invention to establish the threshold values explained hereinafter and to indicate said threshold values acoustically and/or optically.

A first threshold value, which in accordance with the invention can also be used for the counting of the counter of the wear display, may be a reset point in the heating phase, which indicates that the pressure in the pressure cooker is just below the cooking pressure, which predefines the onset of the cooking period. By switching back prematurely, it is possible to prevent the pressure in the pressure cooker from rising further so quickly that an excessive pressure is generated.

A second threshold value (onset of the cooking period) can then be determined once the cooking pressure has been reached. This threshold value is also preferably indicated acoustically. Since this threshold value simultaneously corresponds to the onset of the cooking period, the timer also starts to run (provided a timer is integrated into the pressure detection system) once this second threshold value has been reached.

A third threshold value indicates that an excessive pressure has been reached and preferably also generates an acoustic warning signal.

So that the user can also identify the fact that the different threshold values have been reached merely on the basis of the acoustic signal, without paying attention to an optical display, the acoustic signal can be formed differently in accordance with the invention depending on the threshold value. This can be implemented in a particularly simple manner with a piezo acoustic element activated by the computer unit.

A further threshold value, referred to hereinafter as the zeroed threshold value, may optionally be defined such that the sensor of the pressure detection system identifies correct assembly on a pressure cooker without a pressure present in the pressure cooker. An evaluation of this threshold value by the computer unit can be used to display a readiness for function.

Alternatively or in particular additionally to the aforementioned acoustic signals, optical signals can also be generated in an optical display, the optical signal preferably being displayed once one threshold value has been reached until another threshold value has been reached or until said threshold value is no longer reached. This can be implemented in a particularly simple manner in that the optical signal is generated in accordance with the threshold value status signal. However, the individual optical signals may optionally also be switched on once the different threshold values have been reached and switched off once another threshold value has been reached or once said threshold value is no longer reached.

In order to indicate the different threshold value status signals, it is particularly advantageous to design the optical display in different colors, for example by means of the use of differently colored LEDs in the display of the pressure detection system.

In accordance with the invention, the pressure detection system may also comprise two optical displays, one display being an LC display (LCD) in particular and the other display comprising a plurality of differently colored LED elements. It is thus possible to output information on the LC display, such as a wear display or the remaining cooking time during the timer function, parallel to the threshold value status signals, for example by means of the flashing of differently colored LEDs.

In accordance with a further aspect of the invention according to the invention, at least one threshold value, one period of time and/or another operand used by the computer unit can be parameterisable. For example, the pressure detection system may thus comprise an operating interface with operating buttons, via which the type of stove (radiation heating element with a glass ceramic cover, gas hob, induction hob and/or conventional electric hob) can be input. Due to a similar heating behavior, the gas and induction hobs can also be treated in a combined manner. In this case, the computer unit is designed to select the threshold value corresponding to the input stove type. To this end, the threshold values can be predefined in a fixed manner and stored in a computer unit for the various stove types, for example in the form of a look-up table. This is particularly significant for the first threshold value, when said threshold value indicates the reset point in the heating phase, since the subsequent heating of the stove is highly dependent on the stove type. A reset of the heating output at the stove or the hob should occur earlier, the longer the duration of the subsequent heating once the stove power has been switched back.

A further parameterisable input could be provided for different ring seals made of different materials, if the wear of these ring seals is different. The second period of time for the wear display and/or the counter value of the wear display may then be parameterisable for example in accordance with the threshold value or via a separate input in order to take into account the type of seal material, the stove type and/or another influencing variable affecting wear.

In accordance with the invention, the above-described and further functions can be implemented in a computer unit or distributed between different, independent modules or computer units/processors. From a cost viewpoint, it is particularly advantageous if a computer unit performs all functions and carries out the evaluation of the sensor signals and activation of the displays.

In principle, a very large number of different sensor types can be considered as sensors of the pressure detection system. On the one hand, sensors can be selected that measure a variable connected directly to the pressure in the pressure cooker. For example, these may be pressure sensors or temperature sensors attached on the inner face of the lid and which, for example, measure the steam temperature. The steam temperature is typically also dependent on the pressure prevailing in the pressure cooker.

In accordance with a particularly preferred embodiment, the sensor of the pressure detection system may also detect the pressure in the pressure cooker indirectly for example, in particular by tapping an optical pressure display device, which is integrated into the lid of a pressure cooker, changes its position in accordance with the pressure prevailing in the pressure cooker, and therefore indicates to the user the pressure prevailing in the pressure cooker in an optical-mechanical manner.

To this end, it is particularly advantageous if the pressure detection system comprises a pressure detection device with the sensor, the computer unit, and the display preferably in one housing, and comprises the optical pressure display device preferably in another housing, wherein the optical pressure display device can be attached to the pressure cooker and displays the pressure prevailing inside the pressure cooker. The pressure detection device can then preferably be fixed on the optical pressure display device in such a way that the sensor for detecting the pressure cooperates with the optical pressure display device, for example by asking the position thereof.

In this case, optical, electrical capacitive or electrical inductive or electromagnetic or magnetic measurement methods can be considered.

In accordance with a particularly preferred embodiment, the optical pressure display device comprises an axially displaceable tappet with a magnetic or magnetisable element, the tappet being arranged sealingly in an opening of a lid of the pressure cooker in such a way that the tappet, with rising pressure in the pressure cooker, is displaced in the axial direction against a restoring force of a spring for example. The pressure detection system can then be fixed on the optical pressure display device in such a way that the sensor is arranged above the tappet in the axial direction, the sensor preferably being a magnetic-field sensor. This magnetic-field sensor, for example a Hall sensor, then detects the magnetic field, which varies with distance from the magnetic element and therefore generates a measured value dependent on the pressure inside the pressure cooker. This embodiment is particularly versatile, since the pressure detection device can be fixed in a simple manner to optical pressure display devices of different steam pressure cookers. In addition, the optical pressure display devices can also be retrofitted easily to the lids of pressure cookers, such that the pressure detection system according to the invention can be retrofitted as a whole.

In accordance with a structurally particularly simple and reliable embodiment of the previously described pressure detection system comprising the optical pressure display device and the pressure detection device in different housings, the tappet is guided axially displaceably in a ring of the optical pressure display device, the tappet lifting out from the ring of the optical display device in the event of an increased pressure inside the pressure cooker. The pressure prevailing in the pressure cooker is thus displayed optically to the user, and the magnetic-field sensor of the pressure detection device according to the invention is also influenced.

In order to implement various cooking stages in a technically simple manner in accordance with the invention, the ring of the optical pressure display device can be rotatably mounted in the housing, in particular of a base plate, fixed to the lid of the pressure cooker, in such a way that the restoring force of the tappet can be varied by means of a rotation of the ring relative to the base plate. To generate the restoring force, a spring can be used in a simple manner, of which the restoring force can be varied for example as a result of a change to the spring bias, the travel of the tappet in the optical pressure display device remaining unchanged. The same travel after rotation of the ring of the optical pressure display device then corresponds to another pressure value inside the pressure cooker; the set threshold values, which are dependent on the tappet travel, are not affected thereby however, and therefore the fixed threshold values merely correspond to other pressure values inside the pressure cooker. The pressure detection device can therefore operate in an unchanged manner in accordance with the invention, even during different cooking stages, without the need for parameterization.

In accordance with a particularly simple embodiment of the pressure detection device, it comprises two partially annular latching arms, which are adapted in terms of diameter to the ring of the optical pressure display device and can be fitted over the ring. To this end, the partially annular latching arms are at least flexible enough that they can be applied over the ring of the optical pressure display device and can fix the pressure detection device there. In particular if the sensor is arranged in accordance with the invention in the axial center of the partially annular latching arms, the pressure detection device can be fitted in any desired rotational position on the ring of the optical pressure display device, thus improving the operability of the pressure detection device, since it can always be oriented optimally with respect to the user.

In order to be able to adapt the pressure detection system, where necessary by a service department, to an ageing of the apparatus, for example of the magnetic-field sensor, the computer unit can be designed in accordance with the invention, after a corresponding input, to change into a calibration mode, in which inter alia one or more threshold values can be set. This calibration mode can be introduced for example by a button communication of the operating interface.

In accordance with a further aspect of the pressure detection system according to the invention, a communication module in particular connected to the computer unit for wireless communication with a stove or a heating output regulation or control unit of a stove can be provided in the pressure detection system. The computer unit is then preferably designed, in the event that a threshold value is reached, to send a communication to the stove or the heating output regulation or control unit. The heating output can thus be adjusted or set automatically so that the desired pressure is maintained in the pressure cooker during the cooking process. This leads on the one hand to energy-optimized heating and on the other hand constitutes a safety function, since, if the threshold value for an excessively high pressure is exceeded, the heating output can be reduced immediately. Since an overheating of the pressure cooker also leads to increased wear, the wear is thus also reduced and a reliable wear display is benefitted. This signal can then also be used when controlling or regulating automatic cooking processes in order to achieve a better cooking result by means of an optimal setting of the cooking pressure.

Further advantages, features and possible applications of the present invention will emerge from the following description of the exemplary embodiments and from the drawing. Here, all described features and/or features illustrated schematically form the subject matter of the present invention, either per se or in any combination and also independently of their summary in the claims or of the references of the claims to other claims.

DETAILED DESCRIPTION

Figure 1:
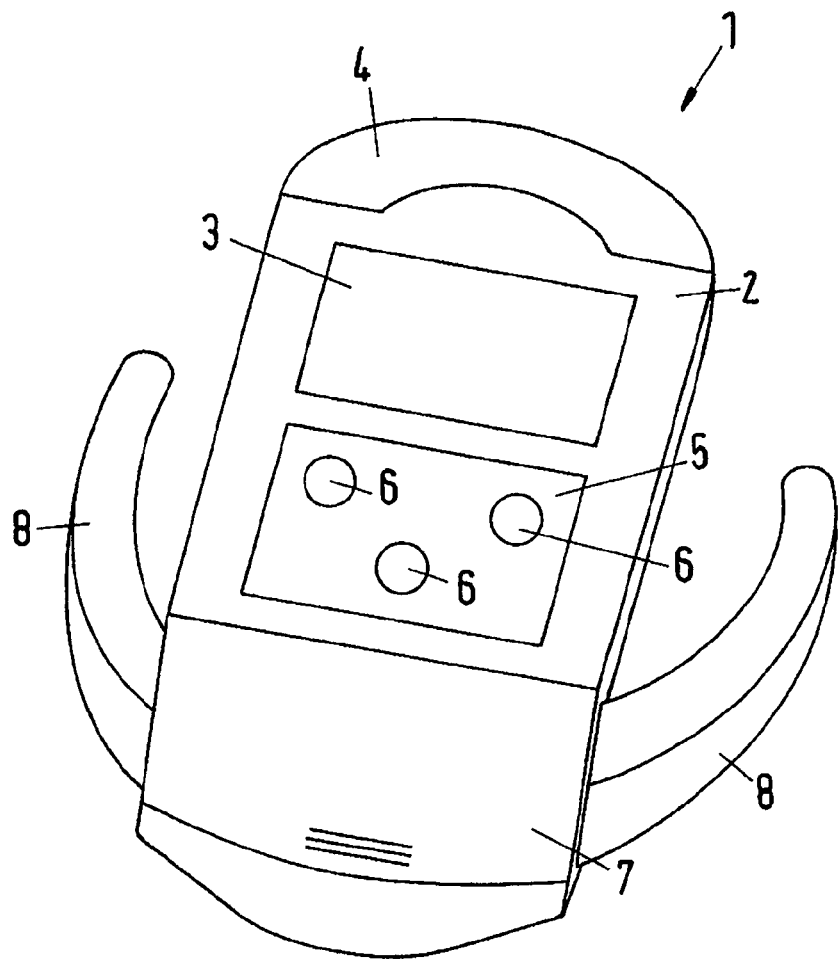
FIG. 1 shows a three-dimensional view of a pressure detection system according to the invention comprising a pressure detection device.

In FIG. 1, the pressure detection device 2 of the pressure detection system 1 according to the invention is illustrated, in which a key aspect of the present invention is implemented by a wear display for wearing parts of a pressure cooker. The pressure detection system 1 formed merely by this pressure detection device 2 therefore also forms the present invention.

The pressure detection device 2 comprises a first display 3, which is formed as an LC display (LCD) and on which various pieces of information can be illustrated in the form of text or by symbols. Furthermore, a second display 4 is provided, which is formed by a plurality of differently colored light-emitting diodes (LEDs) beneath a transparent cover. Furthermore, the pressure detection device 2 comprises an operating interface 5 with operating buttons 6, by means of which the user can make inputs into the pressure detection device 2, which can preferably be made in cooperation with the first and/or second optical display 4.

For example, the pressure detection device 2 may comprise a timer, so that a time can be preset via the operating interface 5, after which the timer outputs a time lapse signal. This preset time can then be presented on the first display 3. Furthermore, the operating interface 5 can be used for inputting parameters, as is yet to be explained below.

The pressure detection device 2 is supplied with energy by a battery arranged in a closable battery compartment 7.

For fixing to a pressure cooker or an optical pressure display device 9, two partially annular latching arms 8 are provided in the illustrated embodiment of the pressure detection device 2, with which the pressure detection device 2 can be fitted on a circular element by latching on the latching arms in any direction of rotation. It goes without saying that the present invention is not fixed to this specific preferred fastening type, but that other suitable fastening methods can also be used.

Figure 2:
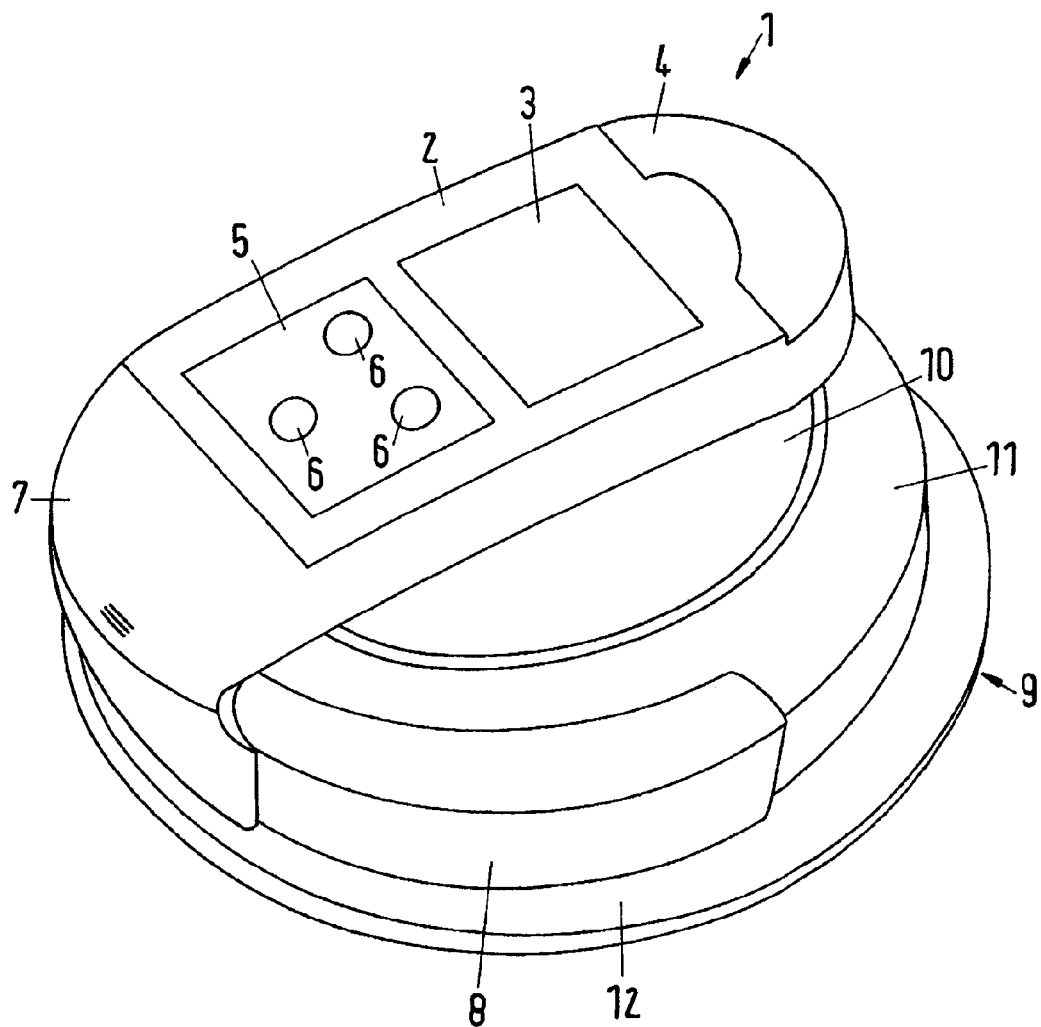
FIG. 2 shows a three-dimensional view of the pressure detection system according to the invention comprising a pressure detection device and optical pressure display device.

The previously mentioned type of fastening of the pressure detection device 2 to an optical pressure display device 9 of the pressure detection system 1 is illustrated in FIG. 2. The optical pressure display device 9 can be attached to the lid of a pressure cooker and indicates the pressure prevailing inside the pressure cooker. To this end, the optical pressure display device 9 comprises an axially displaceable tappet 10, which is displaceable in the direction of the central axis of the cylindrical tappet 10. The tappet 10 is sealingly connected to an opening in the lid of the pressure cooker such that the tappet is displaced against a restoring force with rising pressure in the pressure cooker. In so doing, the tappet 10 moves out from a ring 11 of the optical pressure display device 9 in the axial direction, such that the axially displaceable tappet 10 protrudes beyond the ring 11 in the direction of the pressure detection device 2. An optical pressure display 10 is thus implemented initially, wherein colored markers for example for identifying different pressure ranges may be provided on the side wall (not visible in FIG. 2) of the axially displaceable tappet 10.

The ring 11 is mounted on a base plate 12, which is fixed on the lid 19 of the pressure cooker and is part of the housing of the optical pressure display device 9. The ring is rotatable relative to the base plate 12 and the axially displaceable tappet 10, wherein the restoring force of a restoring element 21 (not illustrated in FIG. 2) is changed and biases the axially displaceable tappet 10 in the direction of the base plate 12. The dependence of the travel of the tappet 12 on the pressure prevailing inside the pressure cooker can thus be adapted and different cooking stages can be set.

The exact function of the present invention will be explained hereinafter on the basis of FIGS. 3 and 4, which show the pressure detection system 1 in a sectional illustration. Here, the core of the invention is the pressure detection device 2 illustrated in FIG. 3, which cooperates with an optical pressure display device 9 according to FIG. 4. The optical pressure display device 9 is one possibility of how the pressure prevailing inside the pressure cooker can be transmitted to the sensor 17 of the pressure detection device 2. The invention is not limited to this however.

Figure 3:
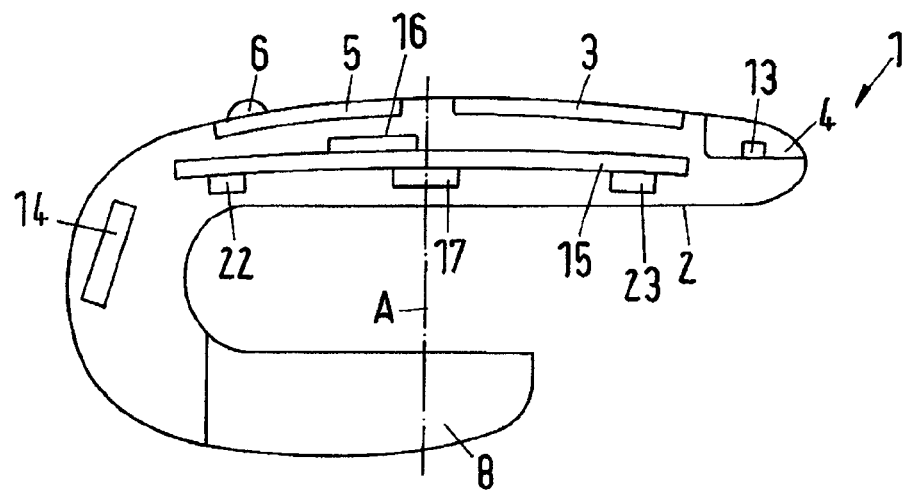
FIG. 3 shows a cross section of the pressure detection device.

In the schematic sectional illustration of the pressure detection device 2 cooperating with the optical pressure display device 9 according to FIG. 3, the LC display of the first display 3 and the light-emitting diode (LED) 13 of the second display 4 can be seen, wherein the second display 4 comprises a plurality of LEDs 13, which may save different colors. The operating interface 5 is also illustrated with an operating button 6.

The energy supply is provided by a battery 14, which is received in the battery compartment 7 (not illustrated in the schematic sectional illustration) and supplies energy to the electronic components of the pressure detection device 2 of the pressure detection system 1.

Two latching arms 8 for fixing the pressure detection device 2 to the optical pressure display device 9 are provided on the side of the pressure detection device 2 opposite the first display 3 and the operating interface 5, only one of said latching arms being visible in the sectional illustration.

A printed circuit board 15, on which a computer unit 16 and the sensor 17 for detecting the pressure prevailing inside the pressure cooker are located, is arranged inside the pressure detection device 2. The sensor 17 is formed as a magnetic-field sensor, in particular as a Hall sensor, and is arranged on the side of the printed circuit board 15 facing the latching arms 8 of the pressure detection device 2. Here, the sensor 17 is positioned on the printed circuit board 15 in such a way that it is arranged in the region of the center axis A of the circle defined by the partially annular latching arms 8 of the pressure detection device 2.

Figure 4:
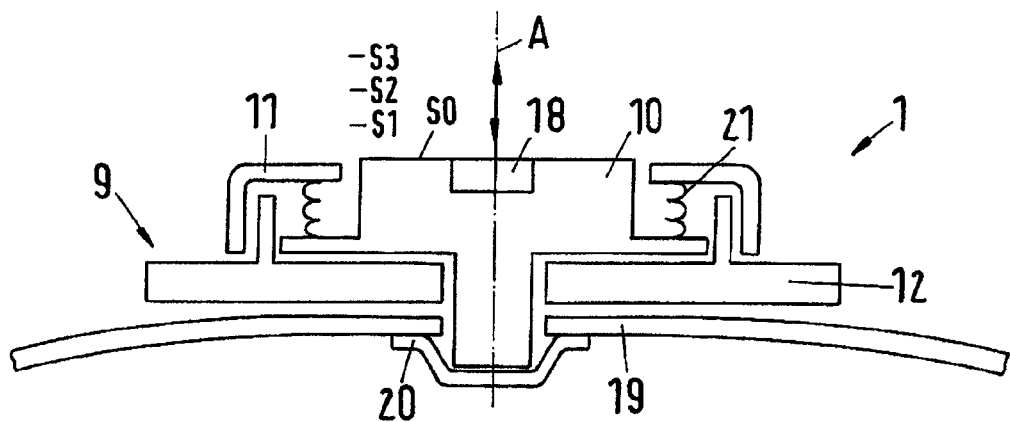
FIG. 4 shows a cross section of the optical pressure display device.

The sensor 17 detects the magnetic field of a magnetic element 18, in particular of a permanent magnet, which is arranged in the axially displaceable tappet 10 of the optical pressure display device 9 and is illustrated in FIG. 4. The measured value generated by the sensor 17 is dependent on the strength of the magnetic field in the region of the sensor 17, which is in turn a function of the distance of the magnetic element 18 from the sensor 17.

As can be inferred from the schematic sectional illustration according to FIG. 4, the optical pressure display device 9 can be fixed to a lid 19 of a pressure cooker in such a way that the axially displaceable tappet protrudes through the wall of the lid 19 into the interior of the pressure cooker. The interior of the pressure cooker is sealed by a flexible seal 20 in such a way that the end of the tappet 10 protruding into the interior of the pressure cooker bears against the flexible seal 20 from the outside. If no pressure is built up inside the pressure cooker, the tappet 10 therefore rests on the base plate 12 of the optical pressure display device 9 under bias, said base plate in turn resting on the lid 19, where it is suitably fastened. The fastening means are not illustrated in the schematic sectional illustration according to FIG. 4 for reasons of clarity.

The bias of the tappet 10 in the direction of the base plate 12 is achieved by a restoring element 21 in the form of a spring, which on one side bears against a flange of the tappet 10 and on the other side is fastened to the ring 11 of the optical pressure display device 9. By rotating the ring 11, the bias of the spring 21 can be changed and the strength of the restoring force can thus be varied.

It goes without saying that FIG. 4 in this respect merely schematically illustrates the function of the optical pressure display device 9, of which the specific design can also be achieved otherwise by a person skilled in the art without departing from the subject matter of the present invention, said function namely being the detection of the magnetic field generated by the magnetic element 18 using the sensor 17 of the pressure detection device 2 in particular for implementation of a wear display and, where necessary, further functions.

Due to the previously described design of the optical pressure display device 9, the flexible tappet 10 is pressed away (upwardly in the drawing) from the base plate by the seal 20 against the restoring force of the restoring element 21 when a pressure builds up inside the pressure cooker, the compressive force of said pressure exceeding the restoring force of the spring or generally of the restoring element 21.

When the pressure detection device 2 as illustrated in FIG. 2 is fixed on the ring 11 of the optical pressure display device 9, the distance between the magnetic element 18, likewise arranged over the center axis A of the ring 11, and the sensor 17 is thus reduced such that the magnetic field detected by the sensor 17 is stronger. Since the tappet 10 is moved further from the base plate 12 in the direction of the sensor 17 with rising pressure, the magnetic field detected by the sensor 17 increases, which leads to an increased measured value of the sensor 17 until the tappet 10 reaches the end of its path of travel defined by the ring 11.

The computer unit 16 is designed to detect and to evaluate the measured values output by the sensor 17. To this end, threshold values S0, S1, S2 and S3 are defined in the computer unit 16 and correspond to different travels of the tappet 10 with different pressure values inside the pressure cooker.

Here, a first threshold value S1 is defined such that it displays a pressure value which is still below the actually desired cooking pressure and indicates that the thermal output of the stove can already be reduced in order to soon reach the cooking pressure, which corresponds to the second threshold value S2 (onset of the cooking period). Lastly, the third threshold value S3 indicates an excessively high pressure inside the pressure cooker, which requires an immediate reduction of the heat supply of the stove to the pressure cooker.

Furthermore, a further, zeroed threshold value S0 may be defined, which characterizes the magnetic field generated by the magnetic element 18 in sensor 17 when the pressure detection device 2 is fitted onto the optical pressure display device 9 in a functionally correct manner, wherein the tappet 10 is still located in its biased position. This can be used to check and, where necessary, display a functionally correct assembly of the pressure detection device 2.

The computer unit 16 is designed, when the first, second and third threshold value S1, S2, S3 are each reached, to generate a different acoustic signal, which is output via piezo element 22 assembled on the printed circuit board. A piezo element 22 of this type therefore forms the acoustic display of the pressure detection system 1.

Furthermore, if any of the threshold values S0, S1, S2, S3 is exceeded, threshold value status signals are generated, which are maintained until the threshold value S0, S1, S2, S3 less a parameterisable hysteresis is undershot or the next highest threshold value S1, S2, S3 is reached. This signal generated by the computer unit 16 is displayed in the second display 4 by illumination or flashing of differently colored LEDs 13, such that the user also receives optical information concerning the status of the pressure cooker.

If the second threshold value S2 is exceeded, the computer unit 16 can be designed to start a timer, which counts down the cooking time in the manner of a timer and, once the preset cooking time has elapsed, emits an optical acoustic and/or other signal. The cooking time still remaining can be displayed in this instance in the first optical display 3.

Irrespective of whether some or all of the previously described features of functions are implemented with the present invention, the computer unit is in any case designed to continue a counter implemented in the computer unit 16 once the first threshold value S1 has been reached, provided the threshold value S1 has been reached or exceeded in an uninterrupted manner during a predefined first period of time of preferably 15 to 25 seconds. The fact that this threshold value S1 has been reached is considered as evidence that a cooking process is taking place.

Since, in particular, the ring seal arranged in the lid 19 of the pressure cooker becomes worn in accordance with the use of the pressure cooker, a wear counter is implemented by means of this counter so that, once a predefined counter value has been reached, a service or wear display can be output on the first display 3 and/second display 4 and reminds the user to replace a ring seal.

Parallel to this, the computer unit 16 may also be designed to output the service display or wear display as a notification on the display 3, 4 even when a second period of time, for example of 2 years, after initialization of the system has elapsed. Initialization is triggered by a first-time switch-on, first-time use of the battery, or execution of an initialization function, wherein the initialization function can be triggered for example by a specific input in the operating interface 5.

As a result of this function, an individual wear display taking into account the usage period and service life of a pressure cooker is created, which contributes to increasing the safety of pressure cookers.

As a further, optional feature, a communication module 23 for wireless communication with a stove can be provided on the printed circuit board, wherein the computer unit 16 is designed, in the event that a threshold value S0, S1, S2, S3 or a plurality of threshold values S0, S1, S2, S3 is reached, to send a notification assigned to the respective threshold value S0, S1, S2, S3 to the stove 10. For example, the stove can thus be switched back automatically when the first threshold value S1 is reached, or the stove can thus be switched off automatically when the third threshold value S3 is reached.

The invention claimed is:

1. A pressure detection system for a pressure cooker, comprising:
    a sensor for detecting a pressure prevailing inside the pressure cooker by means of measured values,
    a computer unit connected to the sensor, and
    a display,
    wherein the computer unit being designed to evaluate the measured values supplied by the sensor and to establish whether at least one first threshold value has been reached, and
    wherein the computer unit is also designed to continue a counter when the measured value reaches the first threshold value and to output a notification on the display when a predefined value of the counter is reached, indicating that a cooking process is taking place, and the number of cooking processes is detected by the counter.

2. The pressure detection system according to claim 1, wherein, the computer unit is designed to check whether the measured value reaches the first threshold value in an uninterrupted manner for a first period of time, and to continue the counter only once the first threshold value has been reached without interruption for the first period of time.

3. The pressure detection system according to claim 1, wherein the computer unit is designed to output the notification on the display when a second period of time has elapsed after initialisation of the system.

4. The pressure detection system according to claim 1, wherein the computer unit is designed, once a threshold value has been reached, to generate a threshold value status signal and to cancel this threshold value status signal when the threshold value less a hysteresis value is no longer reached.

5. The pressure detection system according to claim 1, wherein a timer is provided, which is started once a threshold value is reached and outputs a time lapse signal once a time preset in the timer has elapsed.

6. The pressure detection system according to claim 1, wherein the computer unit is designed to output a signal once a threshold value is reached and/or during a generated threshold value status signal.

7. The pressure detection system according to claim 1 wherein two optical displays are provided, wherein one display is an LC display in particular and the other display in particular comprises a plurality of differently coloured LED elements.

8. The pressure detection system according to claim 1, wherein at least one threshold value, a period of time and/or another operand used by the computer element can be parameterised.

9. The pressure detection system according to claim 1, wherein the pressure detection system comprises a pressure detection device comprising the sensor, the computer unit and the display and an optical pressure display device, which can be attached to the pressure cooker and displays the pressure prevailing inside the pressure cooker, the pressure detection device being fixable to the optical pressure display device in such a way that the sensor for detecting the pressure cooperates with the optical pressure display device.

10. The pressure detection system according to claim 9 wherein the optical pressure display device comprises an axially displaceable tappet with a magnetic or magnetisable element, the tappet being arranged sealingly in an opening of the lid of the pressure cooker in such a way that the tappet is displaced in the axial direction against a restoring force with rising pressure in the pressure cooker, and in that the pressure detection device can be fixed to the optical pressure display device in such a way that the sensor is arranged above the tappet in the axial direction.

11. The pressure detection system according to claim 10, wherein the tappet is guided axially displaceably in a ring of the optical pressure display device, the tappet moving out from the ring of the optical pressure display device with an increased pressure inside the pressure cooker.

12. The pressure detection system according to claim 11, wherein the ring of the optical pressure display device is mounted rotatably on a base plate fixed to the lid of the pressure cooker, and wherein the restoring force of the tappet can be varied by rotation of the ring relative to the base plate.

13. The pressure detection system according to claim 11, wherein the pressure detection device comprises two partially annular latching arms, which are adapted in terms of diameter to the ring of the optical pressure display device and can be fitted on the ring.

14. The pressure detection system according to claim 1, wherein the computer unit is designed to be able to call up a calibration mode, in which one or more pressure values can be set.

15. The pressure detection system according to claim 1, wherein a communication module for wireless communication with a stove is provided, the computer unit being designed to output a notification to the stove by means of the communication module in the event that a threshold value is reached.

* * * * *